United States Patent
Pochapsky (10) Patent No.: US 7,483,213 B2
(45) Date of Patent: Jan. 27, 2009

(54) IMAGE COMBINING VIEWER

(75) Inventor: Eugene Pochapsky, Cheswick, PA (US)

(73) Assignee: Omnitech Partners, Freeport, PA (US)

( * ) Notice: Subject to any disclaimer, the term of this patent is extended or adjusted under 35 U.S.C. 154(b) by 152 days.

(21) Appl. No.: 11/389,404

(22) Filed: Mar. 24, 2006

(65) Prior Publication Data

US 2007/0222854 A1 Sep. 27, 2007

(51) Int. Cl.
*G02B 27/10* (2006.01)
*G02B 27/14* (2006.01)
*G02B 5/28* (2006.01)
*F41G 1/00* (2006.01)

(52) U.S. Cl. .............. 359/618; 359/634; 359/589; 359/583; 359/350; 359/399; 42/114; 42/119; 348/162; 348/164; 250/330; 250/332; 353/69; 396/309

(58) Field of Classification Search .............. 359/350, 359/618, 583, 589, 399, 351, 353, 630, 631, 359/633, 407, 809, 482, 363; 353/100, 101, 353/30, 69, 121, 122; 250/330, 332, 333, 250/339.13, 343, 345, 214 VT; 396/309, 396/333; 348/33, 162, 345; 118/664, 712, 118/720, 726, 730
See application file for complete search history.

(56) References Cited

U.S. PATENT DOCUMENTS

| | | | | |
|---|---|---|---|---|
| 2,809,570 A | * | 10/1957 | Dearing et al. | 396/309 |
| 4,751,571 A | * | 6/1988 | Lillquist | 348/164 |
| 4,806,750 A | * | 2/1989 | Vincent | 250/226 |
| 5,035,472 A | | 7/1991 | Hansen | |
| 5,092,342 A | * | 3/1992 | Hattendorff et al. | 600/532 |
| 5,157,548 A | | 10/1992 | Monnier et al. | |
| 5,434,704 A | * | 7/1995 | Connors et al. | 359/403 |
| 5,737,119 A | | 4/1998 | Mladjan et al. | |
| 5,737,131 A | | 4/1998 | Palmer | |
| 5,781,336 A | | 7/1998 | Coon et al. | |
| 5,841,574 A | | 11/1998 | Willey | |
| 5,892,617 A | | 4/1999 | Wallace | |
| 5,933,277 A | | 8/1999 | Troxell et al. | |
| 5,943,174 A | | 8/1999 | Bryant et al. | |
| 5,973,315 A | | 10/1999 | Saldana et al. | |
| 6,020,994 A | | 2/2000 | Cook | |
| 6,094,302 A | | 7/2000 | Bergstedt | |
| 6,122,099 A | | 9/2000 | Connors et al. | |
| 6,646,799 B1 | | 11/2003 | Korniski et al. | |
| 6,781,127 B1 | * | 8/2004 | Wolff et al. | 250/332 |
| 6,909,539 B2 | | 6/2005 | Korniski et al. | |
| 6,969,856 B1 | * | 11/2005 | Hillenbrand et al. | 250/332 |
| 7,053,928 B1 | * | 5/2006 | Connors et al. | 348/164 |
| 7,132,658 B2 | * | 11/2006 | Weckstrom et al. | 250/339.13 |
| 7,333,270 B1 | * | 2/2008 | Pochapsky et al. | 359/634 |
| 2003/0206338 A1 | | 11/2003 | Cook | |
| 2005/0252062 A1 | * | 11/2005 | Scrogin et al. | 42/119 |
| 2007/0035824 A1 | * | 2/2007 | Scholz | 359/399 |

* cited by examiner

*Primary Examiner*—Loha Ben (57) ABSTRACT

An image combining viewer transmits a daylight image directly through the viewer, while reflecting at least one wavelength other than visible light towards a sensor. A display for displaying the image received by the sensor in a visible wavelength is reflected by the back surface of the mirror back along the optical path, combining the displayed image with the daylight image so that they appear to be a single image.

52 Claims, 4 Drawing Sheets

IMAGE COMBINING VIEWER

BACKGROUND OF THE INVENTION

1. Field of the Invention

The present invention relates to viewers using wavelengths outside the visible spectrum. More specifically, the invention provides a viewer that combines an image transmitted using wavelengths outside the visible spectrum, for example, thermal infrared, with a visible light image.

2. Description of the Related Art

Although other devices for combining visible light images with images formed in other wavelengths have been proposed, there remains a need for such device that minimizes parallax and image shift to a degree to be sufficient for use as a firearms sight, or for use in front of a daytime telescopic sight.

U.S. Patent Application Publication Number US 2003/0206338 A1, disclosing an invention by L. G. Cook and published on Nov. 6, 2003, discloses an optical system for simultaneous imaging of long wave infrared and millimeter wave radiation. The system includes a primary mirror, a Mangin secondary mirror structured to receive light reflected from the primary mirror, and an immersion lens structured to focus the energy received from the secondary mirror. The immersion lens effectively decreases the wavelength of the millimeter wave radiation, allowing a smaller detector to collect the same amount of radiation as would a larger detector in air.

U.S. Pat. No. 6,909,539, issued to R. J. Korniski, et al. on Jun. 21, 2005, discloses a system for combining multiple energy bands to improve scene viewing. The device includes an objective lens that is optimized for both visible/near infrared wavelengths and infrared wavelengths. After passing through the objective lens, visible light is directed towards an image intensifier, while infrared light is transmitted to an IRFPA. The electronic digital image resulting from the infrared image is displayed on a display to a beam combiner to which the intensified image is also displayed. The combined image is displayed to a user's eye. The preferred embodiments are a monocular or binoculars. The patent does not disclose any means for resisting image shift due to expansion and contraction of the various components due to temperature change, or due to the night vision device receiving an impact, a necessary feature for any night vision device used in conjunction with a weapon. A similar device is disclosed in U.S. Pat. No. 6,646,799, issued to the same inventors on Nov. 11, 2003.

U.S. Pat. No. 6,094,302, issued to D. Bergstedt on Jul. 25, 2000, discloses an infrared viewing device having a parallel channel for visible light. The infrared image and visible light image are displayed to the user separately.

U.S. Pat. No. 6,020,994, issued to L. G. Cook on Feb. 1, 2000, discloses a multi-functional viewer providing for infrared viewing, direct visible viewing, CCD based visible TV viewing, and laser range finding. Mode switching mirrors are used to direct the desired image to a single eye piece. No means for combining images is disclosed.

U.S. Pat. No. 5,973,315, issued to M. R. Saldana et al. on Oct. 26, 1999, discloses a day/night observation, ranging and sighting device. Light passing through the objective lens passes through a beam splitter that permits red and orange light to pass through the beam splitter to an image intensifier, and reflects other visible light to a series of lens elements. About 70% to 80% of the light admitted through the objective lens is directed away from the image intensifier. The visible light image and intensified image are combined using a beam combiner, before passing through an aiming reticle and other lens elements towards the eye piece. A laser range finder is also included. A similar device is disclosed in U.S. Pat. No. 5,892,617, issued to R. E. Wallace on Apr. 6, 1999. Neither of these patents discloses any means for resisting image shift due to expansion and contraction of the various components due to temperature changes, or to impact on a device.

U.S. Pat. No. 5,933,277, issued to J. R. Truxell et al. on Aug. 3, 1999, discloses an imaging system combining visible and non-visible electromagnetic radiation for enhanced vision. Electromagnetic radiation entering the imaging system is directed towards a diffraction grating, which reflects the different wavelengths at different angles to the appropriate detectors. The electric signal output from the detectors is transmitted to processing electronics which combine the data from the two scanned signals to produce an enhanced visible image. This patent does not disclose an image combining method having sufficient resolution for use with firearm sights.

U.S. Pat. No. 5,781,336, issued to B. Coon et al. on Jul. 14, 1998, discloses the use of the combination of a magnesium oxide lens and a calcium fluoride lens for multi-spectral imaging systems utilizing both the visible and infrared spectrums.

U.S. Pat. No. 5,157,548, issued to L. Monnier et al. on Oct. 20, 1992, discloses an optical device combining either a direct daylight view or an intensified image with an image generated by an image generator. No method of combining visible light image with an image outside the visible spectrum is disclosed.

U.S. Pat. No. 5,035,472, issued to C. L. Hansen on Jul. 30, 1991, discloses an integrated multi-spectral man portable weapon sight. The sight emits visible, near infrared, and far infrared light through a single objective lens using beam splitters to separate the light into near infrared, far infrared, and visible light. No means of combining visible light image with an image formed in another wavelength is disclosed.

U.S. Pat. No. 5,841,574, issued to G. W. Willey on Nov. 24, 1998, discloses a multi-spectral decentered catadioptric optical system. The entrance pupil of the lens is not concentric with the lens. The small residual obscuration enters the circular pupil from one side, instead of being located in the center.

Accordingly, there is a need for a system of combining a visible light image with an image from a different wavelength, having sufficient resolution and elimination of parallax for use in conjunction with a firearm sight. There is a further need for such a device that may be placed in front of a firearm sight, without changing the relationship between point of aim and the point of impact of the firearm sight.

SUMMARY OF THE INVENTION

The present invention provides an image combining viewer structured to receive both a visible light image and an image transmitted in a wavelength other than visible light, convert the image not in visible light to a visible light image, and to overlay one image over the other so that they appear to be a single image.

The image combining viewer includes a housing defining an optical path therethrough. A fold mirror is secured within the housing. The fold mirror may be a single mirror, or may include separate front and back mirror elements, possibly having a transparent spacer therebetween, with the spacer or other structures within the housing being configured to keep the front and back mirror elements substantially parallel. For the purpose of this description, the mirror elements are substantially parallel if insufficient image shift is introduced to that, if the image combining viewer is used in conjunction with a weapon sight, placing the image combining viewer in front of the weapon sight does not change the relationship between the point of aim and point of impact provided by the weapon sight sufficiently to require a sight adjustment or change of aiming point at typical shooting distances. The fold mirror includes a front surface having a dichroic coating applied thereto. This dichroic coating is adapted to transmit visible light, and to reflect a wavelength outside the visible spectrum, for example, infrared or ultraviolet. The back surface of the mirror has another dichroic coating applied thereto. The dichroic coating on the back surface is adapted to transmit a portion of the visible spectrum, and to reflect another portion of the visible spectrum. The combination of the two dichroic coatings on the front and back surfaces of the mirror permits an image transmitted by visible light to pass through the mirror.

A sensor is secured within the housing, in a location wherein it will receive the light reflected by the front surface of the mirror. If the sensor is, for example, a thermal infrared camera, then the sensor will receive infrared light reflected by the front surface of the mirror. Focusing of the sensor may be accomplished by either moving the sensor towards or away from the mirror, or by moving optical elements between the sensor and the mirror towards or away from the sensor, until the image reflected by the mirror is focused on the sensor.

The focusing of wavelengths other than visible light is further accomplished by an objective lens. The objective lens may be secured in either of two different locations. In one embodiment, the objective lens may be located between the mirror and the sensor. In another embodiment, the objective lens may be located within a forward portion of the housing, so that light traveling along the optical path defined within the housing passes through the objective lens before reaching the mirror. In the second case, a preferred objective lens includes a central portion that is optimized for the transmission of visible light, and an annular portion that is optimized for the transmission of wavelengths other than visible light onto the mirror. For the purpose of this description, a lens is optimized for a given wavelength if it is more effective at transmitting and focusing the given wavelength than other wavelengths.

A display structured to display the image received by the sensor using a portion of the visible spectrum is secured within the housing in a location where the image displayed by the sensor will be reflected by the back surface of the mirror, along the optical path defined within the housing. The display is preferably mounted in a carrier structured to permit lateral movement or rotation of the display, and within a spherical bearing structured to pivot with respect to the housing to permit angular adjustment of the display. The display may therefore be positioned so that an image displayed by the display and reflected by the back surface of the mirror will be overlaid upon the visible light image transmitted through the mirror. Alternatively, the sensor may be structured so that it may be moved instead of the display to accomplish the same image overlay.

The viewer may be used either by itself, or in conjunction with other viewing devices, for example, telescopes, afocal magnifiers, or firearm sights such as telescopic daytime sights or illuminated reticle sights. The user may vary the intensity of the image displayed by the display, thereby permitting the user to view the visible light image alone, a combined image combining the image from the sensor with the daylight image, or the image from the sensor alone.

The use of a single mirror, or a pair of mirror elements having an appropriate spacer therebetween, to both split and combine the images makes the viewer insensitive to changes in the positioning of the mirror, because any error introduced by misalignment of the front surface of the mirror is automatically corrected by having the back surface of the mirror at substantially the same angle.

Accordingly, it is an object of the invention to provide image combining viewer that permits a user to view either the daylight image alone, an image transmitted through a wavelength other than visible light alone, or a combined image.

It is another object of the invention to provide an image combining viewer that can overlay a thermal infrared image over a visible light image.

It is a further object of the invention to provide an image combining viewer that may be used alone, with a telescope or afocal magnifier, or mounted on a weapon in front of a telescopic or illuminated reticle sight.

It is another object of the invention to provide an image combining viewer that does not introduce parallax or registration error when mounted at an angle with respect to a daytime sight.

It is a further object of the invention to provide an image combining viewer that is insensitive to mirror alignment or vibration.

These and other objects of the invention will become more apparent from the following description and drawings.

BRIEF DESCRIPTION OF THE DRAWINGS

Like reference characters denote like elements throughout the drawings.

DETAILED DESCRIPTION OF THE PREFERRED EMBODIMENTS

The present invention provides an image combining viewer for overlaying an image transmitted in a wavelength other than visible light, for example, infrared, with a daylight image.

Figure 1:
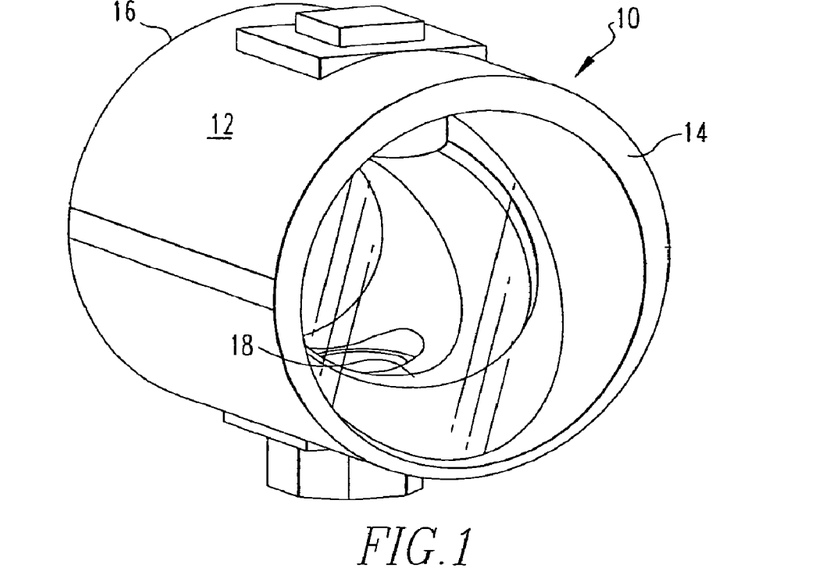
FIG. 1 is a front isometric view of one embodiment of an image combining viewer according to the present invention.
Figure 2:
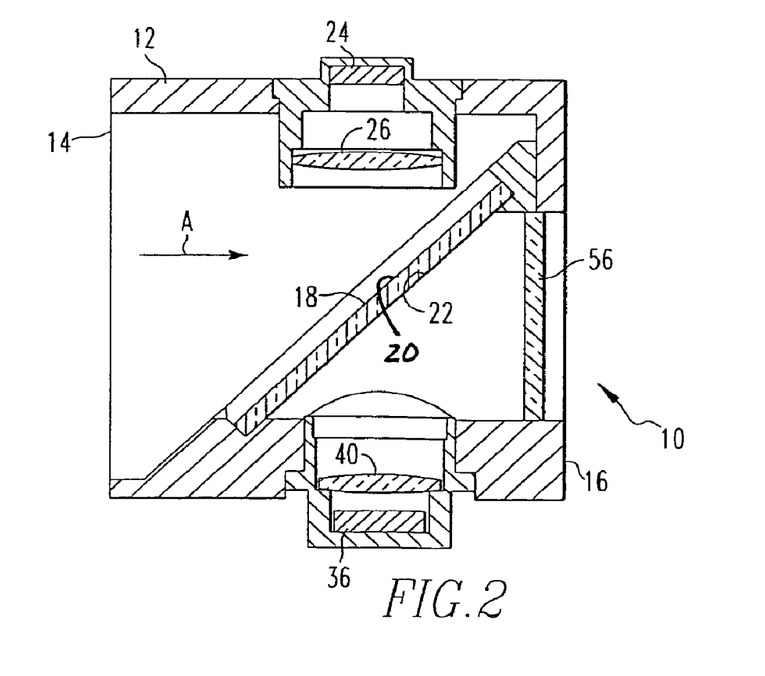
FIG. 2 is a cross-sectional side view of the image combining viewer of FIG. 1.

Referring to FIGS. 1-2, one embodiment of the image combining viewer 10 is illustrated. The viewer 10 includes a housing 12 having a forward end 14 the back end 16. The housing 12 contains a large aperture dichroic fold mirror 18 therein. Although a single mirror 1 8 is illustrated and is most preferred, other acceptable alternatives include multiple mirror elements, possibly with a spacer therebetween, with the spacer or other structures within the housing being configured to keep the mirrors substantially parallel to each other. The fold mirror 18 includes a front surface 20 and a back surface 22, each of which has a dichroic coating applied thereto. The dichroic coating applied to the front surface 20 is adapted to transmit visible light, and to reflect at least one wavelength outside the visible spectrum. Some preferred embodiments are structured to reflect infrared or ultraviolet light. Preferred dichroic coatings for the front surface 20 include thin film dielectric, ion beam assisted deposition hard dielectric, chemical vapor deposition coatings, and rugate filters.

The dichroic coating applied to the back surface 22 of the mirror 18 is adapted to transmit a portion of the visible spectrum and to reflect another portion of the visible spectrum. Some preferred dichroic coatings are adapted to reflect a set of wavelengths within the visible spectrum, for example, red or orange wavelengths, and to transmit other wavelengths within the visible spectrum. Other preferred dichroic coatings for the back surface 22 are capable of both transmitting and reflecting the entire visible spectrum, and will transmit a certain portion of the light striking the back surface 22, reflecting the remainder of the light. For example, the coating may have about 10% reflectivity, so that about 10% of the light striking the coating will be reflected, and the remainder will be transmitted. Preferred dichroic coatings for the back surface 22 include chemical vapor deposition coatings, single or multilayer dielectric, rugate filters, silvered coatings, and partial reflective coatings.

A sensor 24 is secured within one side of the housing 12, in a location wherein it will receive light reflected from the optical path A by the front surface 20 of the mirror 18. The sensor 24 may be any of several different sensors adapted to receive wavelengths of light outside the visible spectrum, for example, a thermal infrared camera, a short wave infrared (SWIR) camera, uncooled detector arrays for 8 to 12 micron or 3 to 5 micron use, lead salt detector arrays, cooled infrared detectors, visible band charge coupled display (CCD) arrays, ultraviolet image sensors, or intensified CCD or CMOS arrays with direct, fiber, or optical coupling.

An objective lens 26 is disposed between the front surface 20 of the mirror 18, and the sensor 24. By placing the objective lens 26 in this location, rather than in the conventional location at the front end 14 of the housing 12, the objective lens 26 does not interfere with the passage of visible light through the viewer 10. The entire surface of the objective lens 26 can therefore be optimized for the desired wavelength. Objective lenses may be optimized for different wavelengths through both the selection of the material from which the lens is made, and the degree of curvature of the surfaces of the lens. Therefore, by placing the objective lens 26 where it will not interfere with visible light traveling along the optical path A, the configuration of the objective lens 26 may be optimized for the wavelength of interest, without regard for how this configuration might be less than ideal for visible light.

Figure 5:
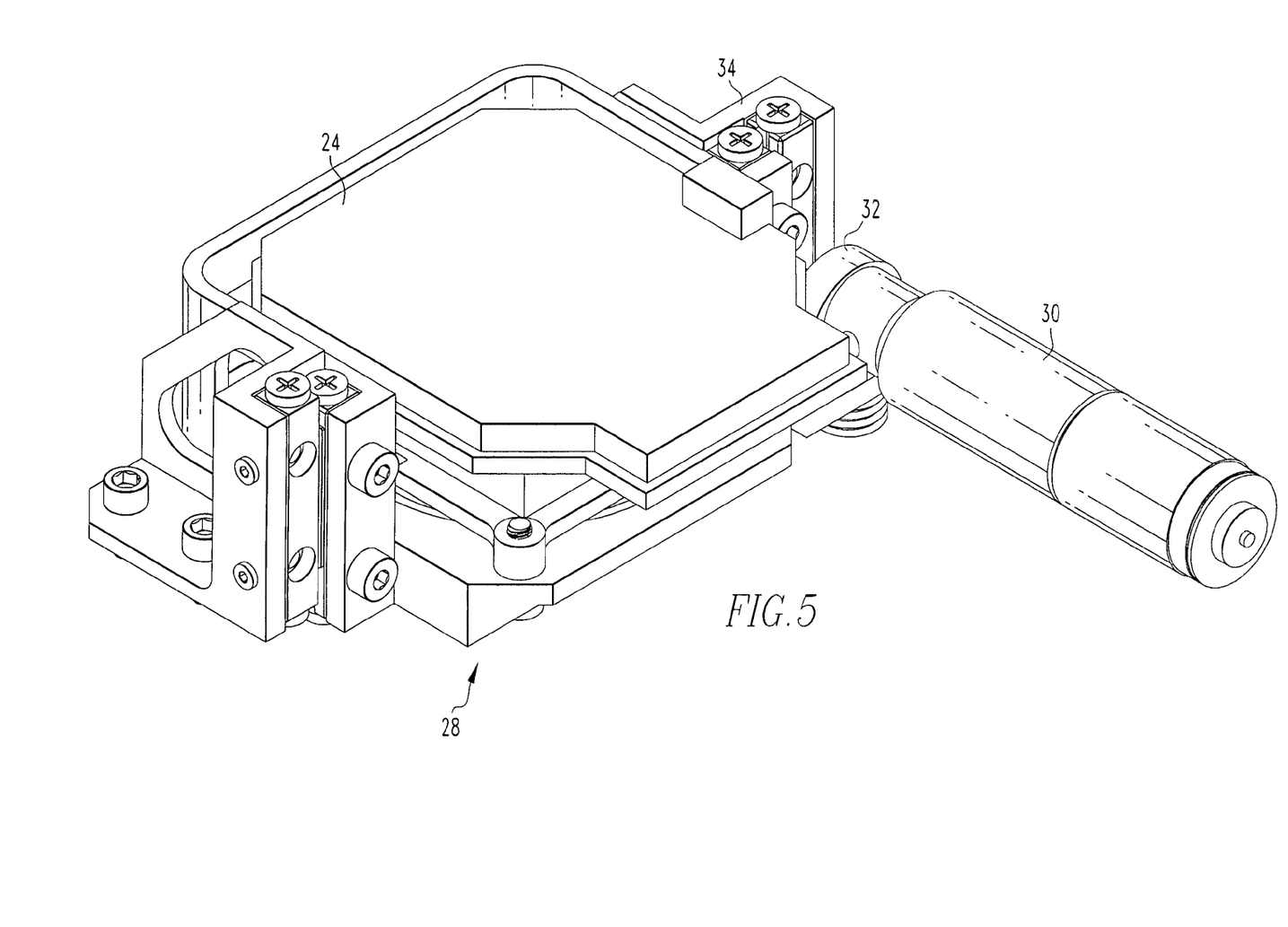
FIG. 5 is a top isometric view of a focusing assembly for a sensor for an image combining viewer of the present invention.

The viewer may be focused by moving either the sensor 24 or the objective lens 26 towards and away from the mirror 18. Referring to FIG. 5, one embodiment of a focusing assembly 28 is illustrated. Although the focusing assembly 28 is illustrated as having the sensor 24 mounted thereon, the focusing assembly 28 could just as easily be used to mount the objective lens 26, so that the objective lens 26 will be moved by the focusing assembly 28 instead of the sensor 24. The focusing assembly 28 includes a focus motor 30 operatively connected to a focus cam 32, which converts the rotational motion of the motor 30 into a linear motion of the sensor 24. The vertical motion of the sensor 24 is guided by a pair of linear bearings 34. Actuation of the focus motor 30 thereby causes the sensor 24 to move closer to or away from the objective lens 26, thereby bringing an image reflected off the front surface 20 of the mirror 18 into focus on the sensor 24. Alternatively, the motor 30 may be replaced by a manual focusing device such as a standard focusing shaft and knob.

Figure 6:
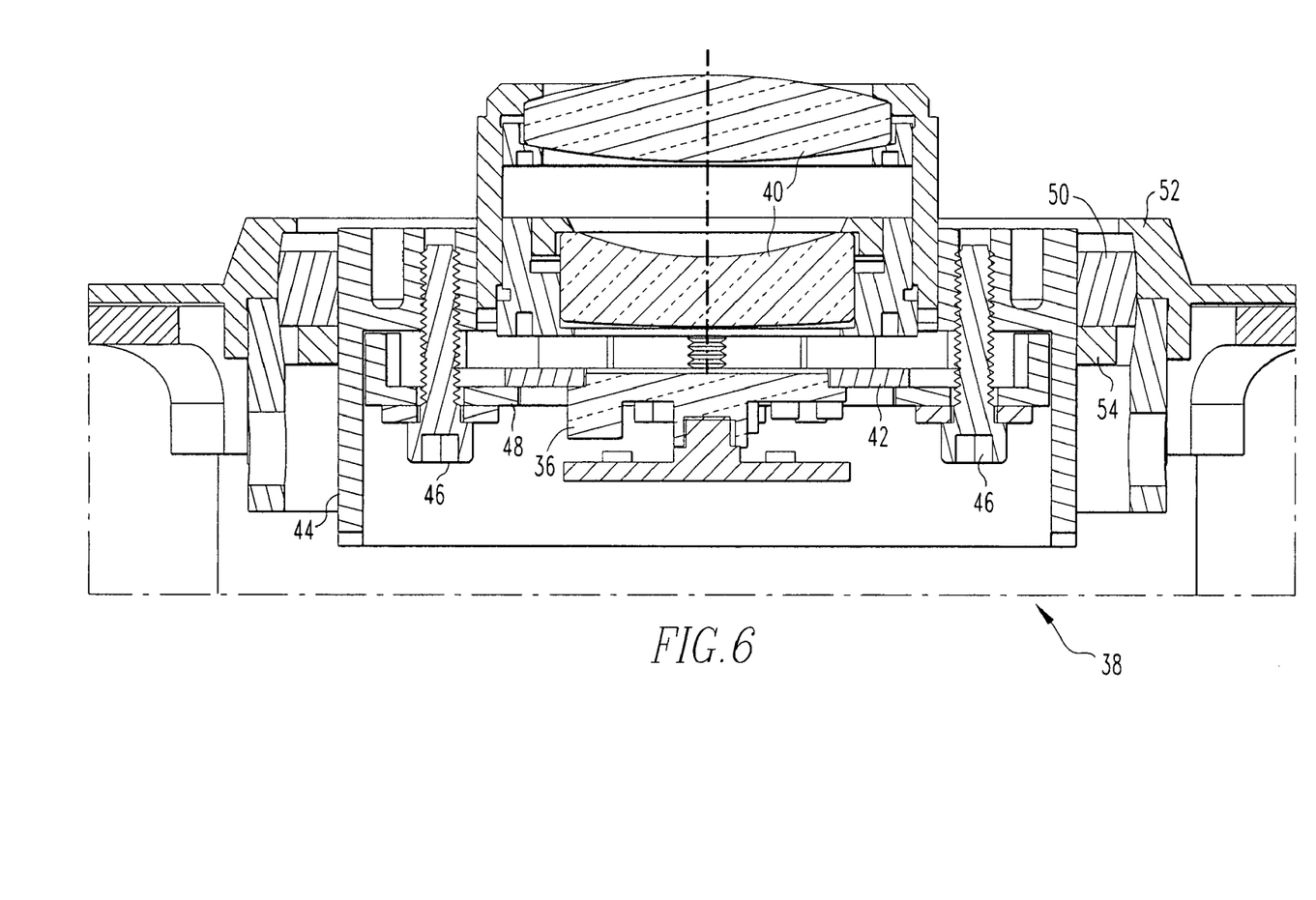
FIG. 6 is a side cross-sectional view of a display and mount for the display for an image combining viewer of the present invention.

A display 36 is structured to display an image received by the sensor 24 in a visible wavelength to the back surface 22 of the mirror 18. The display is best illustrated in FIGS. 2 and 6.

In some preferred embodiments, the display 36 is retained within a display assembly 38, secured within the housing 12. The display 36 may be an inverting fiber optic output display, an LCD display, a micro mirror array, a CRT, a plasma display, or an OLED display. At least one, and in the illustrated example two, display lenses 40 are secured between the display 36 and the back surface 22 of the mirror 18. During assembly of the viewer 10, the distance between the display lenses 40 and the display 36 will be adjusted to provide for proper perceived distance of the displayed image striking the back surface 22 of the mirror 18. Additionally, the display lenses 40 may be adjusted with respect to each other to provide for the correct magnification, which in a preferred embodiment is unity. The display 36 and display lenses 40 are secured within a display carrier 42. The display carrier 42 is itself secured within the adjustment ring 44 by a pair of screws 46, and may be moved in any horizontal direction or rotated in the horizontal plane by loosening the screws 46 and then retightening the screws 46 once the carrier 42 is in the desired position. The screws 46 may in some embodiments bear down on the washer plates 48, which in turn abut the display carrier 42. The adjustment ring 44 is retained in place by a spherical bearing 50 sitting between itself and a spherical bearing seat 52 defined within the housing 12. The use of the spherical bearing 50 permits the adjustment ring 44 to be moved vertically and/or tilted with respect to the rear surface 22 of the mirror 18 during assembly of the viewer 10, and then be locked in place using the lock ring 54 positioned below the spherical bearing 50. This combination of locking adjustments permits the display 36 to be secured within a position wherein the image projected by the display 36 overlays an image passing through the mirror 18 within the viewer 10.

The display 36 may display an image within one portion of the visible spectrum, for example, red or orange, which the dichroic coating on the rear surface of the mirror 22 will be adapted to reflect. In this embodiment, the rear surface 22 is adapted to permit passage of other wavelengths of visible light therethrough. Therefore, the combined image will include wavelengths in the red-orange range from the display 36, and all other wavelengths passing directly through the mirror 18. Alternatively, the dichroic coating on the rear surface of the mirror 22 may be adapted to both reflect and permit passage therethrough of the entire visible spectrum, with a certain percentage reflectivity. For example, the back surface 22 may have about 10% reflectivity, so that about 10% of the light transmitted by the display 36 will be reflected off the back surface 22 to be combined with the remaining visible light image passing through the mirror 18. In this embodiment, a sufficiently bright display 36 is desired so that a loss of about 90% of the image leaves a sufficiently bright image remaining to be easily viewed through the viewer 10. As another alternative, partial reflectivity and wavelength selectivity may be combined to permit transmission of the visible light image while also reflecting a sufficient portion of the image from the display 36. The combined image is displayed through the output window 56.

In use, the viewer 10 may be used by itself, in conjunction with a telescope or afocal magnifier for viewing a more distant scene, or in conjunction with a telescopic or illuminated reticle weapon sight to provide greater visibility under a greater range of light conditions. Some embodiments of the housing 12 may include a mount for securing the housing 12 to a standard Weaver or Picatinny rail, a common method of mounting firearm sights. The visible light entering the viewer 10 will pass through the mirror 18 and the output window 56, going directly to the user or to other optical devices before going to the user. Other wavelengths, most commonly infrared but possibly ultraviolet or another portion of the invisible spectrum, are reflected off the front surface 20 of the mirror 18, so that they pass through the objective lens 26, and are received by the sensor 24. The image carried by these wavelengths is converted to a visible light image and displayed on the display 36. The visible light emitted by the display 36 passes through the lenses 40, striking the back surface 22 of the mirror 18. As the image from the display 36 is reflected off the back surface 22 of the mirror 18, it is overlayed upon the visible light image so that a single image is formed and displayed either directly to the user or to other optical devices, with substantially no perceptible difference between the two images from which the single superimposed image is formed.

Figure 3:
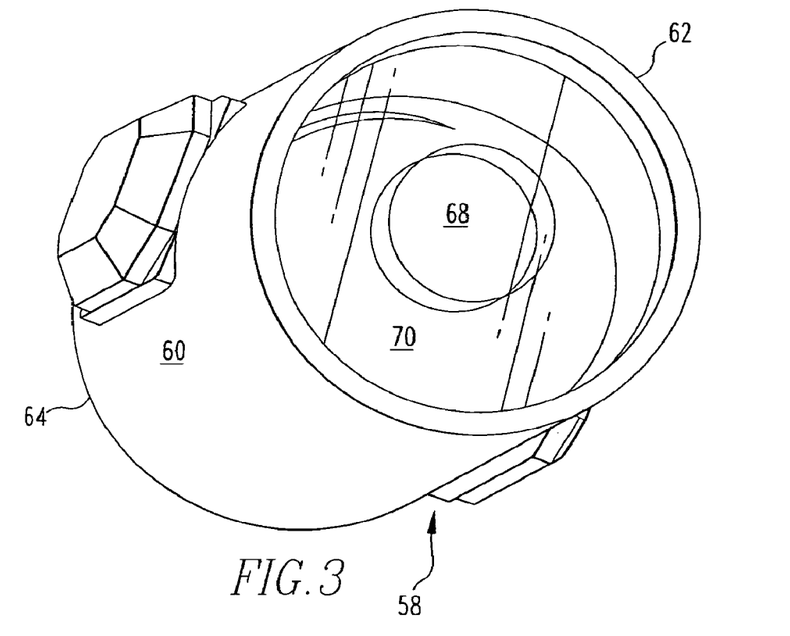
FIG. 3 is a front isometric view of another embodiment of an image combining viewer according to the present invention.
Figure 4:
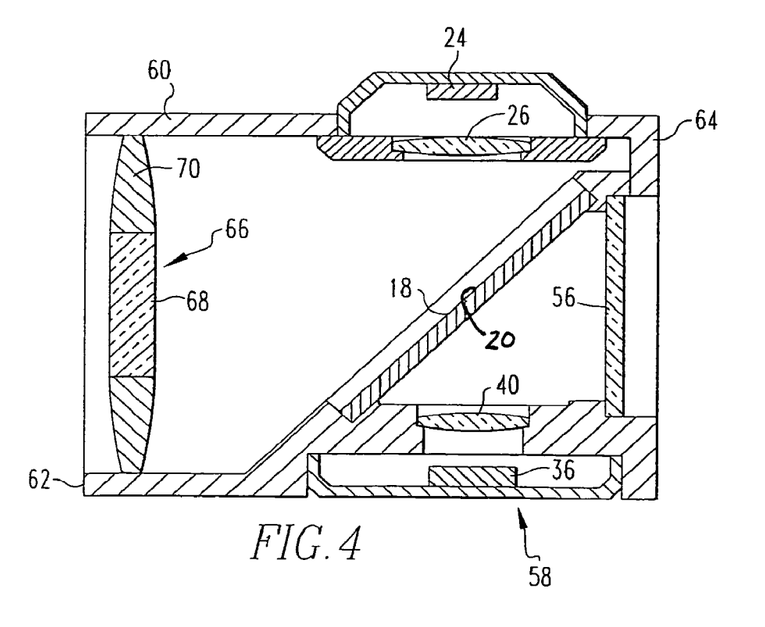
FIG. 4 is a side cross-sectional view of the image combining viewer of FIG. 3.

Referring to FIGS. 3-4, an alternative embodiment of the image combining viewer 58 is illustrated. The viewer 58 includes a housing 60 having a front end 62 and a back end 64. The viewer 58 is very similar to the viewer 10, with the primary difference being the location of the objective lens 66, secured within the front end 62 of the housing 60. The objective lens 66 includes a central portion 68 and an annular portion 70. The central portion 68 is a transparent glass aperture that is adapted to transmit visible light with no substantial interference. The annular portion 70 is optimized for wavelengths other than visible light, for example, infrared or ultraviolet. The embodiment of FIGS. 3-4 have the advantage of being more compact than the embodiment of FIGS. 1-2, because the embodiment of FIG. 4 requires fewer lenses between the mirror 18 and sensor 24.

The viewer 58 contains a large aperture dichroic fold mirror 18 therein. Although a single mirror 18 is illustrated and is most preferred, other acceptable alternatives include multiple mirror elements, possibly with a spacer therebetween, with the spacer or other structures within the housing being configured to keep the mirrors substantially parallel to each other. The fold mirror 18 includes a front surface 20 and a back surface 22, each of which has a dichroic coating applied thereto. The dichroic coating applied to the front surface 20 is adapted to transmit visible light, and to reflect at least one wavelength outside the visible spectrum. Some preferred embodiments are structured to reflect infrared or ultraviolet light. Preferred dichroic coatings for the front surface 20 include thin film dielectric, ion beam assisted deposition hard dielectric, chemical vapor deposition coatings, and rugate filters.

The dichroic coating applied to the back surface 22 of the mirror 18 is adapted to transmit a portion of the visible spectrum and to reflect another portion of the visible spectrum. Some preferred dichroic coatings are adapted to reflect a set of wavelengths within the visible spectrum, for example, red or orange wavelengths, and to transmit other wavelengths within the visible spectrum. Other preferred dichroic coatings for the back surface 22 are capable of both transmitting and reflecting the entire visible spectrum, and will transmit a certain portion of the light striking the back surface 22, reflecting the remainder of the light. For example, the coating may have about 10% reflectivity, so that about 10% of the light striking the coating will be reflected, and the remainder will be transmitted. Preferred dichroic coatings for the back surface 22 include chemical vapor deposition coatings, single or multilayer dielectric, rugate filters, silver coatings, and partial reflective coatings.

A sensor 24 is secured within one side of the housing 12, in a location wherein it will receive light reflected from the optical path A by the front surface 20 of the mirror 18. The sensor 24 may be any of several different sensors adapted to receive wavelengths of light outside the visible spectrum, for example, a thermal infrared camera, a short wave infrared (SWIR) camera, uncooled detector arrays for 8 to 12 micron or 3 to 5 micron use, lead salt detector arrays, cooled infrared detectors, visible band charge coupled display (CCD) arrays, ultraviolet image sensors, or intensified CCD or CMOS arrays with direct, fiber, or optical coupling.

The viewer 58 may be focused by moving the sensor 24 or a lens disposed in front of the sensor 24 towards and away from the mirror 18. Referring to FIG. 5, one embodiment of a focusing assembly 28 is illustrated. Although the focusing assembly 28 is illustrated as having the sensor 24 mounted thereon, the focusing assembly 28 could just as easily be used to mount a focusing lens, so that the focusing lens will be moved by the focusing assembly 28 instead of the sensor 24. The focusing assembly 28 includes a focus motor 30 operatively connected to a focus cam 32, which converts the rotational motion of the motor 30 into a linear motion of the sensor 24. The vertical motion of the sensor 24 is guided by a pair of linear bearings 34. Actuation of the focus motor 30 thereby causes the sensor 24 to move closer to or away from the mirror 18, thereby bringing an image reflected off the front surface 20 of the mirror 18 into focus on the sensor 24. Alternatively, the motor 30 may be replaced by a manual focusing device such as a standard focusing shaft and knob. Alternatively, the viewer 58 may be focused by moving objective lens elements towards or away from the mirror 18 using presently available focusing mechanisms that are well known in the art of telescopes and telescopic firearm sights.

A display 36 is structured to display an image received by the sensor 24 in a visible wavelength to the back surface 22 of the mirror 18. The display is best illustrated in FIGS. 2 and 6. In some preferred embodiments, the display 36 is retained within a display assembly 38, secured within the housing 12. The display 36 may be an inverting fiber optic output display, an LCD display, a micro mirror array, a CRT, a plasma display, or an OLED display. At least one, and in the illustrated example two, display lenses 40 are secured between the display 36 and the back surface 22 of the mirror 18. During assembly of the viewer 10, the distance between the display lenses 40 and the display 36 will be adjusted to provide for proper perceived distance of the displayed image striking the back surface 22 of the mirror 18. Additionally, the display lenses 40 may be adjusted with respect to each other to provide for the correct magnification, which in a preferred embodiment is unity. The display 36 and display lenses 40 are secured within a display carrier 42. The display carrier 42 is itself secured within the adjustment ring 44 by a pair of screws 46, and may be moved in any horizontal direction or rotated in the horizontal plane by loosening the screws 46 and then retightening the screws 46 once the carrier 42 is in the desired position. The screws 46 may in some embodiments bear down on the washer plates 48, which in turn abut the display carrier 42. The adjustment ring 44 is retained in place by a spherical bearing 50 sitting between itself and a spherical bearing seat 52 defined within the housing 12. The use of the spherical bearing 50 permits the adjustment ring 44 to be moved vertically and/or tilted with respect to the rear surface 22 of the mirror 18 during assembly of the viewer 10, and then be locked in place using the lock ring 54 positioned below the spherical bearing 50. This combination of locking adjustments permits the display 36 to be secured within a position wherein the image projected by the display 36 overlays an image passing through the mirror 18 within the viewer 10.

The display 36 may display an image within one portion of the visible spectrum, for example, red or orange, which the dichroic coating on the rear surface of the mirror 22 will be adapted to reflect. In this embodiment, the rear surface 22 is adapted to permit passage of other wavelengths of visible light therethrough. Therefore, the combined image will include wavelengths in the red- orange range from the display 36, and all other wavelengths passing directly through the mirror 18. Alternatively, the dichroic coating on the rear surface of the mirror 22 may be adapted to both reflect and permit passage therethrough of the entire visible spectrum, with a certain percentage reflectivity. For example, the back surface 22 may have about 10% reflectivity, so that about 10% of the light transmitted by the display 36 will be reflected off the back surface 22 to be combined with the remaining visible light image passing through the mirror 18. In this embodiment, a sufficiently bright display 36 is desired so that a loss of about 90% of the image leaves a sufficiently bright image remaining to be easily viewed through the viewer 10. As another alternative, partial reflectivity and wavelength selectivity may be combined to permit transmission of the visible light image while also reflecting a sufficient portion of the image from the display 36. The combined image is displayed through the output window 56.

In use, the viewer 58 may be used by itself, in conjunction with a telescope or afocal magnifier for viewing a more distant scene, or in conjunction with a telescopic or illuminated reticle weapon sight to provide greater visibility under a greater range of light conditions. The housing 60 of some preferred embodiments includes a mount for mounting the viewer 58 on a Weaver or Picatinny rail. The visible light entering the viewer 58 will pass through the central portion 68 of the objective lens 66, next passing through the mirror 18 and the output window 56, going directly to the user, or to other optical devices before going to the user. Other wavelengths, most commonly infrared but possibly ultraviolet or another portion of the invisible spectrum, pass through the annular portion 70 of the objective lens 66, which focuses them on the front surface 20 of the mirror 18. The mirror 18 reflect these wavelengths towards the sensor 24. The image carried by these wavelengths is converted to a visible light image and displayed on the display 36. The visible light emitted by the display 36 passes through the lenses 40, striking the back surface 22 of the mirror 18. As the image from the display 36 is reflected off the back surface 22 of the mirror 18, it is overlayed upon the visible light image so that a single image is formed and displayed either directly to the user or to other optical devices, with substantially no perceptible difference between the two images from which the single superimposed image is formed.

The present invention therefore provides an image combining viewer that permits a user to view either the daylight image alone, an image transmitted through a wavelength other than visible light alone, or a combined image consisting of one image overlayed over the other image to appear as a single image. In some preferred embodiments, the viewer may provide for the viewing of either a visible light image, a thermal infrared image, or both simultaneously. A user may therefore use thermal infrared viewing to locate partially obscured images or targets, and then use visible light to get a better look at images or targets identified using thermal infrared. The viewer may be used alone, in conjunction with a telescope or afocal magnifier, or used in conjunction with a telescopic or illuminated reticle weapon sight. The viewer does not introduce parallax or registration error when mounted at an angle with respect to a daytime sight. The viewer is further insensitive to mirror alignments or vibration.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. An image combining viewer, comprising:
   a housing defining an optical path therethrough;
   a sensor disposed within the housing, the sensor being structured to receive a wavelength outside the visible spectrum;
   a display disposed within the housing, the display being adapted to display an image received by the sensor using a portion of the visible spectrum;
   at least one mirror disposed within the housing, the at least one mirror having a front surface and a back surface, the front surface having a dichroic coating adapted to transmit visible light and to reflect the wavelength outside the visible spectrum, the front surface being adapted to direct the reflected wavelength from the optical path towards the sensor, the back surface having a dichroic coating adapted to transmit a portion of the visible spectrum and to reflect another portion of the visible spectrum, the back surface being adapted to reflect light transmitted by the display to a direction substantially along the optical path; whereby an image transmitted by the at least one mirror and the image displayed by the display are combined into a single image; and
   means for focusing the sensor.

2. The viewer according to claim 1, further comprising an objective lens disposed within a front of the housing.

3. The viewer according to claim 2, wherein the objective lens comprises a central portion that is optimized for visible light, and an annular portion that is optimized for a wavelength other than visible light.

4. The viewer according to claim 1, further comprising an objective lens disposed between the front surface of the at least one mirror and the sensor.

5. The viewer according to claim 1, wherein the sensor is selected from the group consisting of an uncooled infrared detector array, a cooled infrared detector array, a lead salt detector array, a SWIR detector array, a visible band CCD array, and an intensified CCD or CMOS array having direct, fiber, or optical coupling.

6. The viewer according to claim 1, wherein the means for focusing the sensor includes means for moving either the sensor or a lens disposed between the sensor and the at least one mirror towards and away from the front surface of the at least one mirror.

7. The viewer according to claim 1, further comprising means for adjusting a position of the sensor.

8. The viewer according to claim 7, wherein the means for adjusting a position of the sensor includes a spherical bearing disposed between the sensor and the housing, the spherical bearing being structured to permit adjustment of the angle of the sensor with respect to the housing.

9. The viewer according to claim 8, wherein the means for adjusting a position of the sensor includes a carrier structured to permit lateral movement of the sensor.

10. The viewer according to claim 7, wherein the means for adjusting a position of the sensor includes a carrier structured to permit lateral movement of the sensor.

11. The viewer according to claim 1, further comprising means for adjusting a position of the display.

12. The viewer according to claim 11, wherein the means for adjusting a position of the display includes a spherical bearing disposed between the display and the housing, the spherical bearing being structured to permit adjustment of the angle of the display with respect to the housing.

13. The viewer according to claim 12, wherein the means for adjusting a position of the display includes a carrier structured to permit lateral movement of the display.

14. The viewer according to claim 11, wherein the means for adjusting a position of the display includes a carrier structured to permit lateral movement of the display.

15. The viewer according to claim 1, wherein the display is selected from the group consisting of an inverting fiber optic output display, a LCD display, a micromirror array, a CRT, a plasma display, and an OLED display.

16. The viewer according to claim 1, wherein the front surface and back surface of the at least one mirror are formed on a single mirror.

17. The viewer according to claim 1, wherein the dichroic coating applied to the front surface of the at least one mirror is selected from the group consisting of thin film dielectric, ion beam assisted deposition hard dielectric, chemical vapor deposition coatings and rugate filters.

18. The viewer according to claim 1, wherein the dichroic coating applied to the back surface of the at least one mirror are is selected from the group consisting of chemical vapor deposition coatings, dielectric, rugate filters, silvered coatings, and partial reflective coatings.

19. The viewer according to claim 1, wherein the wavelength outside the visible spectrum is infrared.

20. An image combining viewer, comprising:
a housing defining an optical path therethrough;
a sensor disposed within the housing, the sensor being structured to receive a wavelength outside the visible spectrum;
a display disposed within the housing, the display being adapted to display an image received by the sensor using a portion of the visible spectrum;
at least one mirror disposed within the housing, the at least one mirror having a front surface and a back surface, the front surface having a dichroic coating adapted to transmit visible light and to reflect the wavelength outside the visible spectrum, the front surface being adapted to direct the reflected wavelength from the optical path towards the sensor, the back surface having a dichroic coating adapted to transmit a portion of the visible spectrum and to reflect another portion of the visible spectrum, the back surface being adapted to reflect light transmitted by the display to a direction substantially along the optical path; whereby an image transmitted by the at least one mirror and the image displayed by the display are combined into a single image; and
an objective lens disposed within a front of the housing, the objective lens comprising a central portion that is optimized for visible light and an annular portion that is optimized for a wavelength other than visible light.

21. The viewer according to claim 20, further comprising an objective lens disposed between the front surface of the at least one mirror and the sensor.

22. The viewer according to claim 20, further comprising means for adjusting a position of the sensor.

23. The viewer according to claim 22, wherein the means for adjusting a position of the sensor includes a spherical bearing disposed between the sensor and the housing, the spherical bearing being structured to permit adjustment of the angle of the sensor with respect to the housing.

24. The viewer according to claim 23, wherein the means for adjusting a position of the sensor includes a carrier structured to permit lateral movement of the sensor.

25. The viewer according to claim 22, wherein the means for adjusting a position of the sensor includes a carrier structured to permit lateral movement of the sensor.

26. The viewer according to claim 20, further comprising means for adjusting a position of the display.

27. The viewer according to claim 26, wherein the means for adjusting a position of the display includes a spherical bearing disposed between the display and the housing, the spherical bearing being structured to permit adjustment of the angle of the display with respect to the housing.

28. The viewer according to claim 27, wherein the means for adjusting a position of the display includes a carrier structured to permit lateral movement of the display.

29. The viewer according to claim 26, wherein the means for adjusting a position of the display includes a carrier structured to permit lateral movement of the display.

30. The viewer according to claim 20, wherein the front surface and back surface of the at least one mirror are formed on a single mirror.

31. The viewer according to claim 20, wherein the dichroic coating applied to the front surface of the at least one mirror is selected from the group consisting of thin film dielectric, ion beam assisted deposition hard dielectric, chemical vapor deposition coatings and rugate filters, and the dichroic coating applied to the back surface of the at least one mirror is selected from the group consisting of chemical vapor deposition coatings, dielectric, rugate filters, silvered coatings, and partial reflective coatings.

32. The viewer according to claim 20, wherein the wavelength outside the visible spectrum is infrared.

33. An image combining viewer, comprising:
a housing defining an optical path therethrough;
a sensor disposed within the housing, the sensor being structured to receive a wavelength outside the visible spectrum;
a display disposed within the housing, the display being adapted to display an image received by the sensor using a portion of the visible spectrum;
at least one mirror disposed within the housing, the at least one mirror having a front surface and a back surface, the front surface having a dichroic coating adapted to transmit visible light and to reflect the wavelength outside the visible spectrum, the front surface being adapted to direct the reflected wavelength from the optical path towards the sensor, the back surface having a dichroic coating adapted to transmit a portion of the visible spectrum and to reflect another portion of the visible spectrum, the back surface being adapted to reflect light transmitted by the display to a direction substantially along the optical path; whereby an image transmitted by the at least one mirror and the image displayed by the display are combined into a single image; and
means for adjusting a position of the sensor.

34. The viewer according to claim 33, further comprising an objective lens disposed within a front of the housing.

35. The viewer according to claim 33, wherein the means for adjusting a position of the sensor includes a spherical bearing disposed between the sensor and the housing, the spherical bearing being structured to permit adjustment of the angle of the sensor with respect to the housing.

36. The viewer according to claim 35, wherein the means for adjusting a position of the sensor includes a carrier structured to permit lateral movement of the sensor.

37. The viewer according to claim 33, wherein the means for adjusting a position of the sensor includes a carrier structured to permit lateral movement of the sensor.

38. The viewer according to claim 33, further comprising means for adjusting a position of the display.

39. The viewer according to claim 38, wherein the means for adjusting a position of the display includes a spherical bearing disposed between the display and the housing, the spherical bearing being structured to permit adjustment of the angle of the display with respect to the housing.

40. The viewer according to claim 39, wherein the means for adjusting a position of the display include a carrier structured to permit lateral movement of the display.

41. The viewer according to claim 38, wherein the means for adjusting a position of the display include a carrier structured to permit lateral movement of the display.

42. The viewer according to claim 33, wherein the front surface and back surface of the at least one mirror are formed on a single mirror.

43. The viewer according to claim 33, wherein the dichroic coating applied to the front surface of the at least one mirror is selected from the group consisting of thin film dielectric, ion beam assisted deposition hard dielectric, chemical vapor deposition coatings and rugate filters, and the dichroic coating applied to the back surface of the at least one mirror is selected from the group consisting of chemical vapor deposition coatings, dielectric, rugate filters, silvered coatings, and partial reflective coatings.

44. The viewer according to claim 33, wherein the wavelength outside the visible spectrum is infrared.

45. An image combining viewer, comprising:
a housing defining an optical path therethrough;
a sensor disposed within the housing, the sensor being structured to receive a wavelength outside the visible spectrum;
a display disposed within the housing, the display being adapted to display an image received by the sensor using a portion of the visible spectrum;
at least one mirror disposed within the housing, the at least one mirror having a front surface and a back surface, the front surface having a dichroic coating adapted to transmit visible light and to reflect the wavelength outside the visible spectrum, the front surface being adapted to direct the reflected wavelength from the optical path towards the sensor, the back surface having a dichroic coating adapted to transmit a portion of the visible spectrum and to reflect another portion of the visible spectrum, the back surface being adapted to reflect light transmitted by the display to a direction substantially along the optical path; whereby an image transmitted by the at least one mirror and the image displayed by the display are combined into a single image; and
means for adjusting a position of the display.

46. The viewer according to claim 45, further comprising an objective lens disposed within a front of the housing.

47. The viewer according to claim 45, wherein the means for adjusting a position of the display includes a spherical bearing disposed between the display and the housing, the spherical bearing being structured to permit adjustment of the angle of the display with respect to the housing.

48. The viewer according to claim 47, wherein the means for adjusting a position of the display includes a carrier structured to permit lateral movement of the display.

49. The viewer according to claim 45, wherein the means for adjusting a position of the display includes a carrier structured to permit lateral movement of the display.

50. The viewer according to claim 45, wherein the front surface and back surface of the at least one mirror are formed on a single mirror.

51. The viewer according to claim 45, wherein the dichroic coating applied to the front surface of the at least one mirror is selected from the group consisting of thin film dielectric, ion beam assisted deposition hard dielectric, chemical vapor deposition coatings and rugate filters, and the dichroic coating applied to the back surface of the at least one mirror is selected from the group consisting of chemical vapor deposition coatings, dielectric, rugate filters, silvered coatings, and partial reflective coatings.

52. The viewer according to claim 45, wherein the wavelength outside the visible spectrum is infrared.

* * * * *